United States Patent [19]

Dai

[11] Patent Number: 5,732,154

[45] Date of Patent: *Mar. 24, 1998

[54] HANDWRITING AND CHARACTER RECOGNITION SYSTEM

[76] Inventor: Xiao-Wei Dai, 121, Whipple St., #29, Worcestor, Mass. 01610

[*] Notice: The term of this patent shall not extend beyond the expiration date of Pat. No. 5,438,631.

[21] Appl. No.: 417,218

[22] Filed: Apr. 5, 1995

Related U.S. Application Data

[63] Continuation of Ser. No. 135,050, Oct. 12, 1993, Pat. No. 5,438,631.
[51] Int. Cl.$^6$ ................................................. G06K 9/46
[52] U.S. Cl. ............................... 382/197; 382/202
[58] Field of Search .................................. 382/181, 185, 382/187, 201, 197, 202

[56] References Cited

U.S. PATENT DOCUMENTS

3,909,785  9/1975  Howells ................................ 382/187
4,905,295  2/1990  Sato ...................................... 382/187

Primary Examiner—Joseph Mancuso
Assistant Examiner—Gerard Del Rosso
Attorney, Agent, or Firm—Thomas L. Adams

[57] ABSTRACT

A method and system for multistroked oriental-language character-recognition by codifying sequential character strokes, uses a direction code (using two digits and representing four directions) for each stroke's travel direction, and a position code (using two digits and representing four positions) for each stroke's relative position of its starting point relative to the ending point of its previous stroke. Strokes which might have more than one direction at different instants of handwriting are codified by substituting one or two digits in their direction code with one or two replacement digits, for e.g., 'x'. Similarly, strokes which might have more than one relative position at different instants of handwriting are codified by substituting one or two digits in their position code with one or two replacement digits, for e.g., 'x'. A code, for a character, which consists of a sequence of the direction code and the relative position code is called a DXWC. A database which consists of DXWCs can be established by training the computer system using the described method for a big set of characters. A new particular DXWC (called NewC), which may not have any replacement code symbols because of having only a single sample, can be compared with any existing DXWC (called OldC) in the database to achieve a recognition of a new handwritten character. OldCs which might have an 'x' type codes symbols or digits are compared ignoring the 'x' digits.

23 Claims, 5 Drawing Sheets

HANDWRITING AND CHARACTER RECOGNITION SYSTEM

This is a continuation of application, Ser. No. 08/135,050, filed Oct. 12, 1993, now U.S. Pat. No. 5,438,631.

FIELD OF THE INVENTION

This invention generally relates to recognition of handwritten language characters and more particularly to recognition of oriental language characters which are each comprised of several sequential strokes, e.g., Chinese language characters.

BACKGROUND OF THE INVENTION

Much has been written in the recent past about the need for handwriting recognition and the complications encountered in achieving a high degree of accuracy in pen-based computing. It has been acknowledged by writers and researchers alike all along and even as recently as 1992 that handwriting recognition is one field where there is great need for innovation.

One possible method of handwriting recognition is to use a comparator which would compare a hand-written character to match with a character stored in a database and display the matched character for approval by the user. Such an approved character in printed form can be used in whatever sequence might be desired, for printing a script such as in word processing. This exercise becomes practically meaningful in situations where letters cannot easily and swiftly typed from a limited keyboard, such as for example, while writing Chinese or Japanese scripts. Even the simplest form of typewriter which can be used for typing Chinese or Japanese language script would have in excess of more than ten thousand distinctly different characters representing sounds which have to be chosen individually fox being picked up mechanically and typing therefrom in a sequence.

Attempts have been made in prior art to process handwritten discrete cursive characters in a manner suitable for computer processing. In one such system, character recognition is made on line and is distinguished by recognizing character strokes put in in real time and considered in the chronological order in which they are written. In yet another word processing system for Chinese language, all character strokes are standardized and classified into a predefined number of strokes, each stroke being represented by a key. The strokes in a proper sequence are entered using keys to complete a word much in the same manner as writing. In such a system however, the full advantages of a conventional wording processing are not always available, and no provision for real time writing which can be machine typed is available.

By far the greatest need exists for systems wherein the user writes characters having strokes using a pen, wherein recognized characters in printed form derived from a memory are displayed in a character display area. The efficiency of such systems depends to a large extent on the accuracy of recognition of the characters and the codification technique by which the characters are stored in memory and the manner of mapping handwritten characters to selected characters from the memory. The success of such a handwriting recognition system can be visualized as dependent on the simplicity and reliability of the methodology used for recognizing the elements of the written characters, i.e., the sequential strokes in the case of Chinese or Japanese language for example.

Setback with Prior Art Handwriting Recognition Software

A considerable amount of handwriting recognition software has been developed with varying degrees of success. The accuracy of character recognition has not been impressively high with available prior art methods because of setbacks therein which have not yet been resolved. It is essential that any successful character recognition software and hardware need to have provisions for accommodating the significant variations in the manner in which several individuals might write the same language character, or variations in the manner in which a single individual might write the same language character at different times. Unable to address and accommodate this problem, several known versions of the handwriting recognition software require the writer to print characters, or write them within boxes, or train the computer to learn or adapt the particular writer's writing.

Another issue is the speed of handwriting recognition. If users take the time to carefully print characters, generally, there would be sufficient time for a comparator to map the written character to a selected printed character from a memory base. With natural, relatively fast writing however, prior art character recognition software might have a problem coping with the writing speed.

Some available character recognition systems have attempted to measure or quantify velocity/acceleration during stroke writing, as well as pen-pressure and tilt. These provisions make prior art systems more expensive and less reliable however.

IEEE publication "Character Recognition Based on Attribute Dependent Programmed Grammar", Vol. 14, No. 11, November 1992, teaches recognition of Korean Characters by a syntactic method. Attribution information such as angle, length, connection and relation of strokes in syntactic rules are used for Korean Character recognition as taught in the paper. Such prior art process of Character recognition essentially needs preprocessing comprising extraction of primitives obtained by "thinning" the different directional strokes. It is essential in this prior art process that the connectedness property of the object should be preserved after "thinning". This prior art process is complicated and is designed exclusively with Korean Characters in mind which Characters have strokes of varying line width. The present invention does not require any preprocessing and can be applied regardless of line widths of strokes.

Codifying the Sequential Strokes of Written Characters

Codifying the character strokes using this invention can be done by using known digitizers or known pen computers. "Overlay" digitizers as they are known, are placed on the top of an LCD screen, and typically use either a resistive or capacitive film that would assist in generating a signal when a pen is used thereon. On the other hand, a second type of digitizer known as the underlay digitizer may be electromagnetic and senses proximity or pen contact.

Codifying can also be done using a pen computer using a hard writing surface and a relatively softer pen. If it is a computer with an underlay digitizer, the writing surface can be a plain glass surface which protects the LCD. If the computer has an overlay digitizer, the glass surface is provided with a resistive or capacitive coating. In both cases the glass surface will preferably have to be slightly etched to facilitate writing.

Other methods of recognizing surface writing may be used as well with the present invention, so long as the starting point location, direction and end point location relative to the starting point are recognizable by the inventive method which is used for character recognition.

In a successful character recognition system which is geared to recognize Chinese characters for example, there is need for making allowances for 1) accommodating individual writing styles whereby some strokes, even though in the right sequence, may be slanting differently by a range of angles; accommodating slight differences in the slant and appearance of strokes of given character elements when a single individual writes the same character differently each time;

2) recognizing the fact that two different individuals might use slightly different stroke sequences for writing the same character and yet, the character recognition system should have the capability of mapping the hand-written characters of two individuals in different stroke sequences to one and the same printed character in the character display area;

3) a possibility that certain character strokes might end up in a cursive fashion during fast writing, resulting in fewer distinct character strokes than called for in the ideal situation, i.e., than in the printed version for example; the character recognition system should have the capability of mapping handwritten characters in non cursive and cursive fashions to the proper printed character despite the cursive writing making fewer strokes or character elements.

Known prior art character recognition systems do not offer the flexibility as in the three aspects listed herein above. Known prior art systems also do not have an easy simple and reliable manner of Codification of the characters based on sequential strokes.

The present inventive system obviates the disadvantages of prior art systems and offers a simple, highly reliable and flexible character recognition system, using a unique codification approach as described in greater detail hereinafter.

SUMMARY OF THE INVENTION

The invention in its broad form resides in a character codification system wherein each character stroke or element is codified and stored in its sequence in a memory. The codification of the character strokes in elements of each known language word or character appears preferably in the form of a string which might comprise a first code, a second code and selectively a third code. The first and second codes might be '0' and '1' (or vice versa) and the third code might be an alphabet such as 'x'.

According to another aspect of the invention, a character recognition system for recognizing characters with a plurality of sequential strokes comprises a predetermined direction code for categorizing direction of strokes, and a predetermined position code for categorizing the starting position of subsequent strokes relative to a previous stroke. Using such predetermined direction and position codes, a code string to represent a written character is generated and compared with a code string in a database to obtain a match. The categorizing may conveniently done by using a plurality of predetermined direction code keys and position code keys on a keyboard.

Stroke and Character Codification

Character strokes are each codified according to a preferred embodiment of the invention, wherein all the character strokes of a given character hand-written by a user in a known sequence are coded and stored serially in a register or appropriate memory. The preferred manner of codification is as described hereinafter, and is referred to by the acronym DXWC (Dai, Xiao-Wei Code).

For the purpose of this invention there is no need that each language character should have only one unique sequence of strokes. There may be a first alternative sequence and a second alternative sequence, all pertaining to the same character. As described hereinafter, all the alternative stroke sequences will be mapped to the same identified printed character.

Each stroke of a Chinese character as written might be uniquely defined by using the principles of the present invention, as comprising a known starting point, a direction of travel and a known end point, as will be described in greater detail hereinafter. The first stroke is codified based on its direction of travel and the location of its end point. The second stroke is codified by the relative location of its starting point and its travel to its end point; so on and so forth, until the last stroke of the character when the next stroke does not exist, and its starting point need not be determined. The codes so obtained for the strokes in a known sequence are written/stored in a string from which it is possible to map the code string to a selected character chosen from a database. The selected character may be displayed in a display area for approval by user by a simple key or a button, whereupon the selected character is added for typing, printing or word processing as the case may be.

In a preferred embodiment described herein, the stroke direction codes are determined by whether the stroke travels in the 1st, 2nd, 3rd or 4th of a first set of four predetermined angular sectors. The starting point of a subsequent stroke is codified using a second set of four angular sectors, by the location of the starting point of the subsequent stroke relative to the end point of the previous stroke.

Selection of a character using a code string may be done by using any known comparator software, which may be simply a standard C language function such as STRCMP (string1, string2).

BRIEF DESCRIPTION OF DRAWING

A more detailed understanding of the invention may be had from the following description of a preferred embodiment, given by way of example and to be understood in conjunction with the accompanying drawing wherein.

DESCRIPTION OF THE PREFERRED EMBODIMENT

The invention codification method described herein is referred to as the DXWC which stands for Dai, Xiao-Wei Code as aforesaid.

Figure 1:
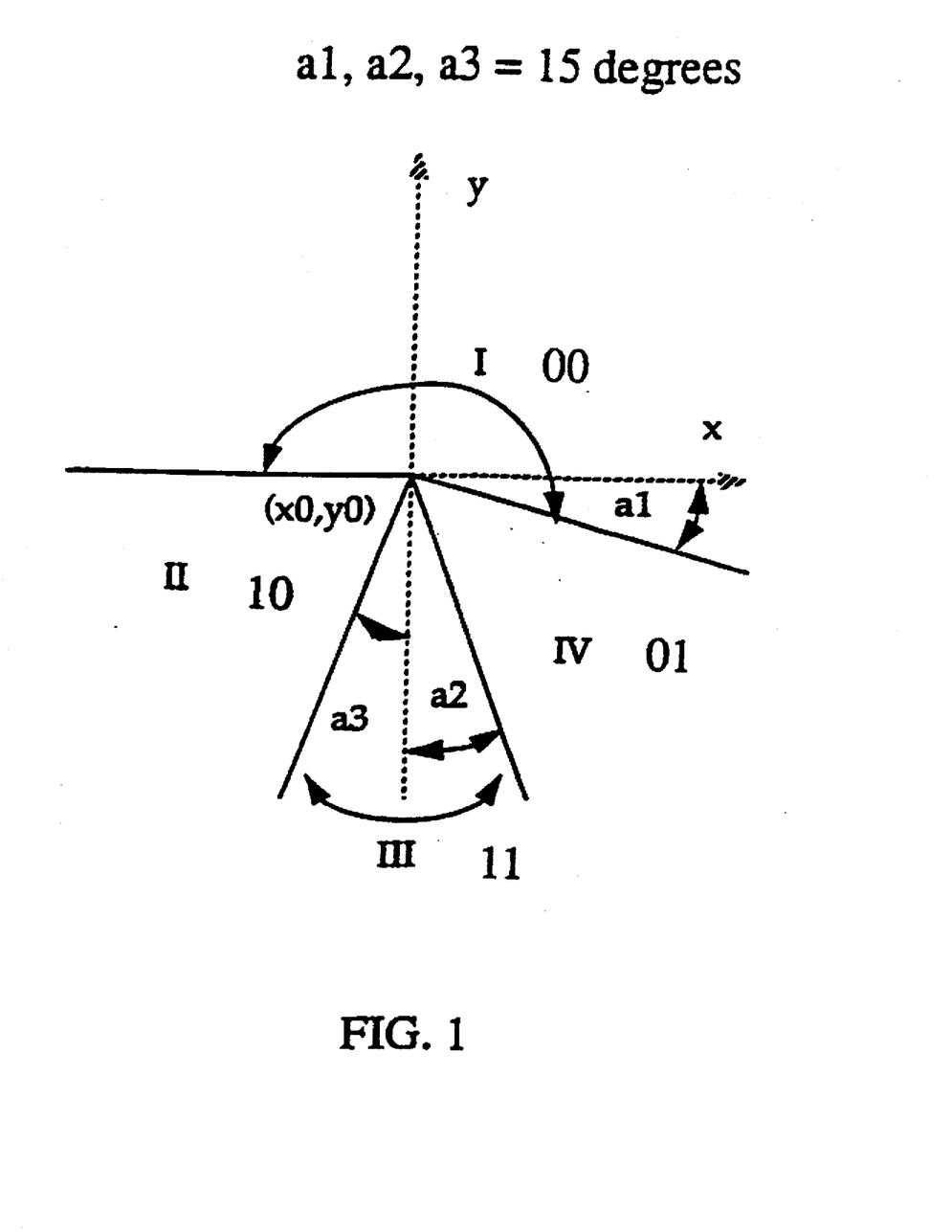
FIG. 1 illustrates a direction code diagram and shows a first set of four angular sectors for codifying the travel direction of each stroke.

With particular reference to FIG. 1, illustrated is a diagram which assists codifying character strokes for their travel direction, and end point identification. For purposes of the inventive system described herein, the starting point of each stroke is considered to be at the origin, i.e., at x0, y0, while applying the stroke travel direction according to FIG. 1. As may be seen, four unequal quadrants are illustrated, quadrant I being defined by angle equal to 180+a1 degrees, quadrant II being defined by angle 90-a3 degrees, quadrant III defined by an angle equal to a3+a2 degrees, and quadrant IV defined by 90-a1-a2 degrees. Even though four quadrants are illustrated and as shown, the angles a1, a2 and a3 are each equal to 15 degrees, the four quadrants may be replaced by 3 sectors or 5 sectors for instance, and the angles a1, a2 etc. need not be the same. The essential requirement is that each sector (quadrant) is identifiable by a code which will be associated with a character stroke which travels and ends in that sector.

As illustrated, the unequal quadrants I, II, III and IV respectively are represented by codes 00, 10, 11 and 01.

Figure 2:
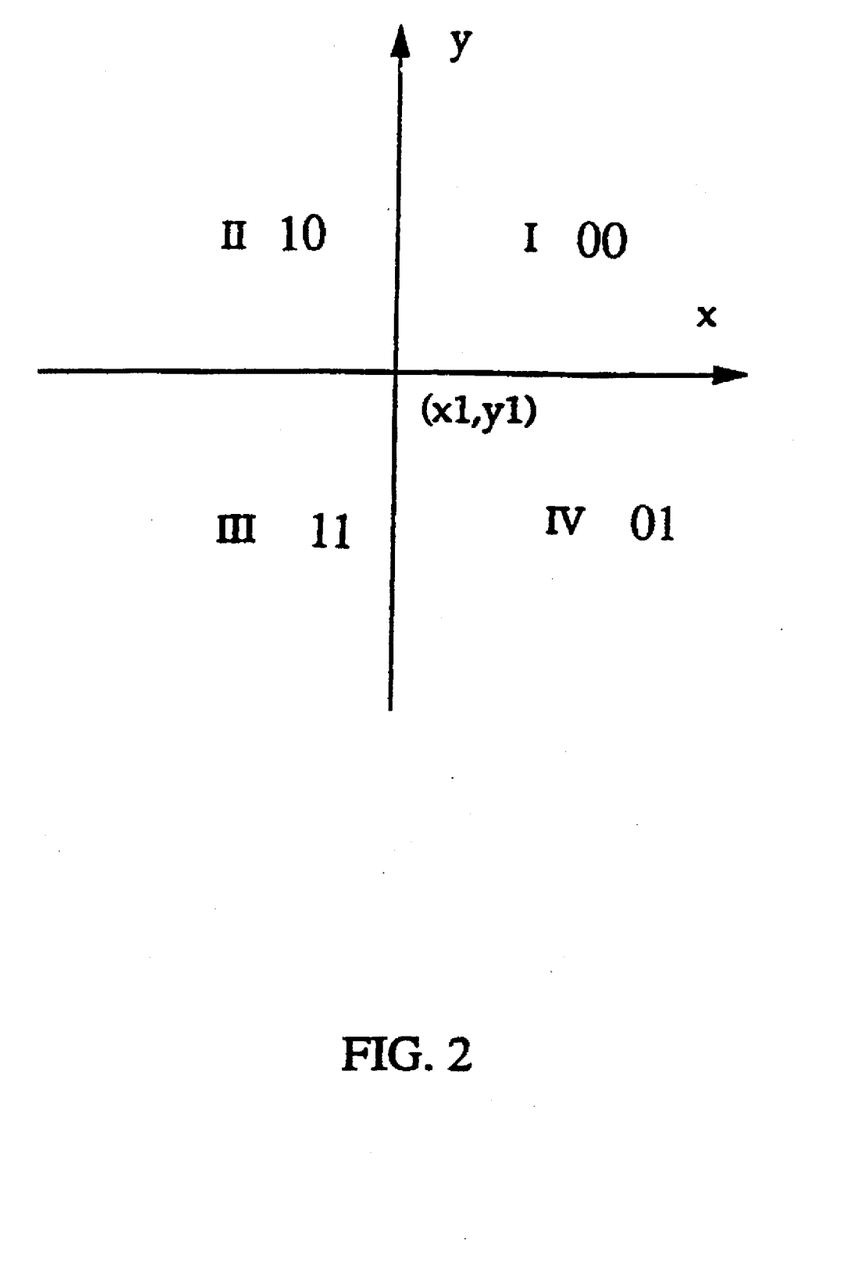
FIG. 2 illustrates a position code diagram and shows second set of four angular sectors for codifying the starting point location of a subsequent stroke.

FIG. 2 illustrates a schematic of four similar quadrants identified as quadrants I, II, II and IV which as described hereinafter are associated with starting position codes 00, 10, 11 and 01 respectively. With respect to the end point of the first stroke, if the end point is considered to be the origin in FIG. 2, the location of the starting point of the second stroke is what decides the position code of the second stroke.

Using the codes defined in FIGS. 1 and 2, it will be clear that the very first stroke in a character has only the direction code comprising two digits. The second stroke has a position code applying the codification in FIG. 2 and then a direction code applying the codification in FIG. 1. This codification process can be continued till the last stoke, which will not have a subsequent stroke. Except the first stroke, each subsequent stroke will have, as described herein a four digit code, which comprises two digits for the direction and two digits for the position. Accordingly, a Chinese character which has "N" strokes will have (4N-2) digits in the codification.

It is to be noted that the codes '0' and '1' used herein can be interchanged. Alternatively, any other first code and second code used in accordance with the principles explained with reference to in FIG. 1 and 2 will serve the same function.

The use of the third code to accommodate handwriting variations:

It is recognized that a single predetermined stroke might occasionally be written by two individuals to end in different sectors. It is also conceivable that a single individual on two different occasions might end a stroke in different sectors. In such a case, a coding such as '1x' to represent both '10' for sector II and '11' for sector III can be used. Thus, using the system of the present invention, a third code 'x' in addition to the first and second codes '0' and '1' can be used in the code string representing any given Chinese character to capture all conceivable stroke variations.

It should be appreciated that generically, the third code alternatively can take the form of any letter other than 'x'. Likewise, the first and second codes '0' and '1' can be replaced by any other characters or symbols which are machine recognizable.

Figure 3A:
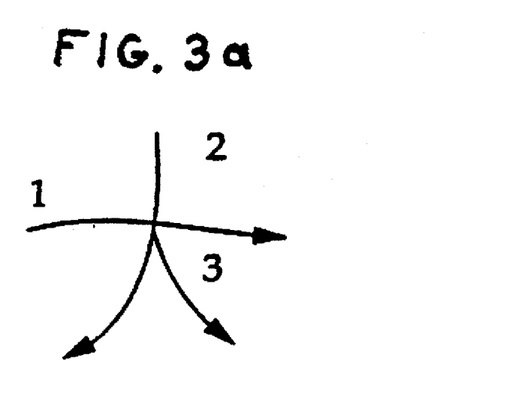
FIG. 3a–3b illustrates an example of practical writing variations of a simple Chinese character which are encountered by handwriting recognition systems.
Figure 3B:
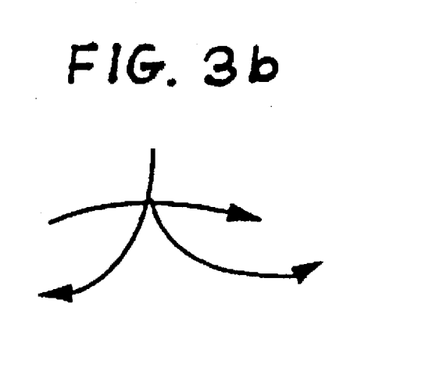

FIG. 3 illustrates slight variations which can occur in the stroke directions while writing a simple Chinese character. FIG. 3a illustrates a first type of rendition of a relatively simple Chinese character, whereas FIG. 3b illustrates the same Chinese character with strokes slightly modified in direction of travel and the end point of the strokes. In both cases, the directions of the arrows which are part of the strokes show the direction in which the strokes are drawn.

Codification for FIG. 3a

The starting point of the first stroke may be considered to be at the origin. Since the first stroke ends in sector I of FIG. 1, it codified for direction as '00'. With respect to the end point of the first stroke being considered the origin in FIG. 2, the second stroke commences in quadrant II of the position code FIG. 2, which is codified for position as '10'. The second stroke ends in sector II of the direction code in FIG. 1, and is codified as '10'. If the end of stroke 2 is considered as the origin in position code of FIG. 2, the third stoke starts in the first quadrant I of the position code in FIG. 2 and is codified as '00'. Stroke 3, using the direction code of FIG. 2 can be coded for direction as '01'. Consequently, the DXWC string code for the character of FIG. 3a could be written as '0010100001'. Because of a variation in the manner of ending the third stroke, with reference to FIG. 3b, it could end in sector I of the direction code of FIG. 1, being coded as a '00', instead of a '01'. Consequently, the DXWC string code for the character in FIG. 3b (wherein the only significant difference from the character of FIG. 3a is in the third stroke, ) mill be '0010100000'. In the present invention, as described herein, both the string codes of FIG. 3a and 3b may be mapped to the same printed character. The last digit of the string code being the only code digit which is at variance between the characters of FIG. 3a and 3b, a DXWC string code which can apply to both the characters of FIG. 3a and 3b can be written according to the invention as '001010000x', which can be mapped to the same basic printed character which both the FIG. 3a and 3b characters are intended to be. 'x' is the third code used in addition to the first and second.

It is important to note while doing the comparator function for the DXWC string code '0010100001', it would be acceptable to compare only significant code digits and ignore the third code 'x'.

Figure 4:
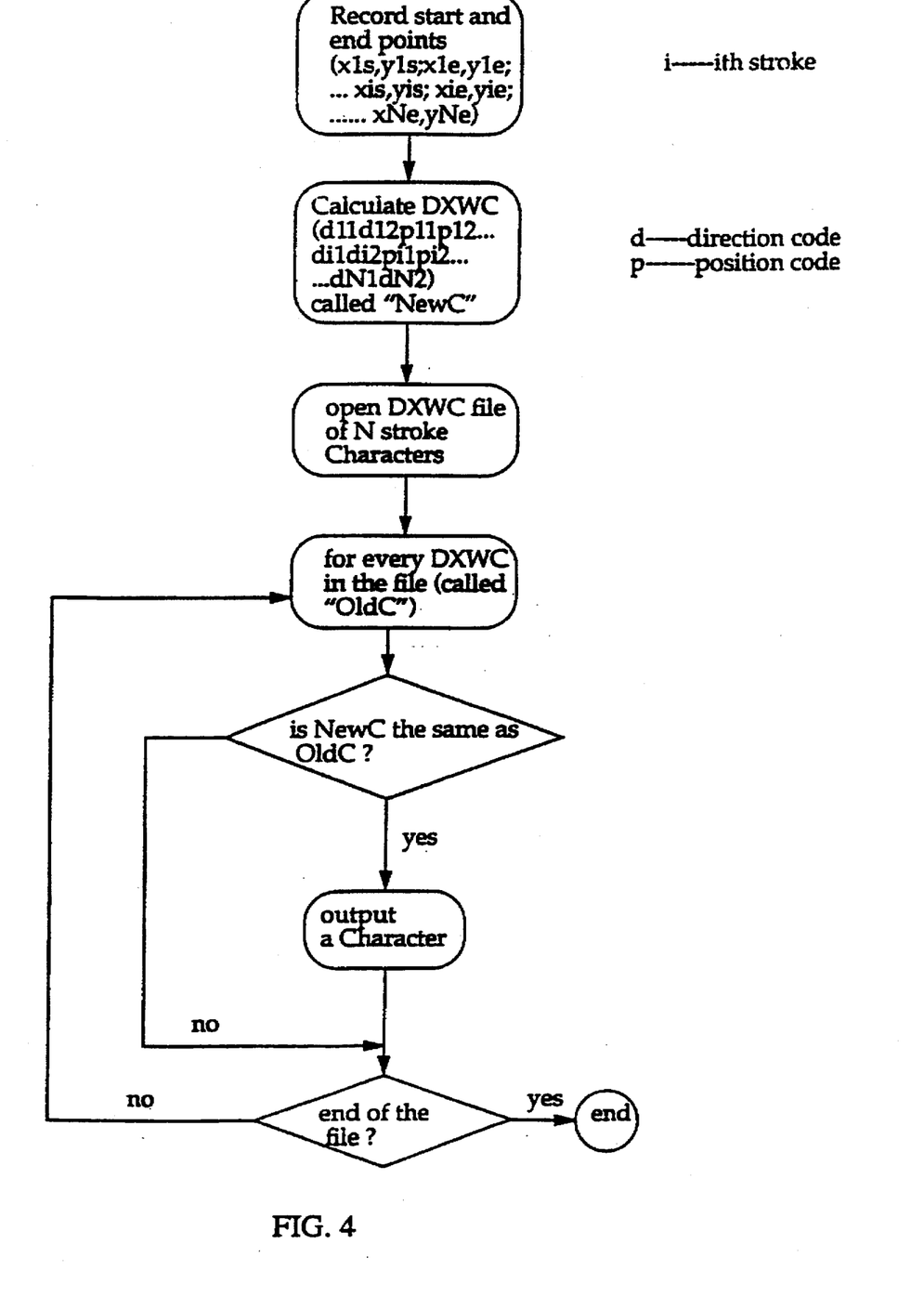
FIG. 4 illustrates a typical flowchart of an exemplary embodiment of the inventive system for codifying characters to produce an output of a printed character suitable for printing, typing or word-processing.

FIG. 4 illustrates a flow diagram whereby several written oriental (or other) characters with strokes can be codified in preparation for computer typing, printing or word-processing as described. If a character which is being written has N character strokes, it is first codified using the direction code 'd' from FIG. 1 and the position code 'p' from FIG. 2. The generated string code may be called NewC. A DXWC file in memory which stores N stroke characters is opened. These stored characters may called OldC. Every OldC is compared with the NewC, the comparison of the string codes being limited to the significant portion of the code only, ignoring the 'x' or the third code content. If a match occurs, the selected OldC character is displayed on a display area for approval by the user. The comparison will continue till all the OldC characters from the memory are exhausted.

Thus, all the characters in a written passage can be codified, compared, and matched with OldCs for approval. Experimental setups by users with varying degrees of capability and different writing speeds have shown that 1) different and individualistic writing styles are accommodated in the character recognition method and system of the present invention;
2) differences in the writing style of the same individual at different times, by way of slanting the strokes differently or ending the strokes in different regions are accounted for and accepted;
3) cursive writing whereby a character which supposedly has N distinct strokes is written by individuals to have N-1 or N-2 strokes, is accounted for. All cursive variations which are desired can be codified in the OldC are mapped to the same desired character.

Figure 5:
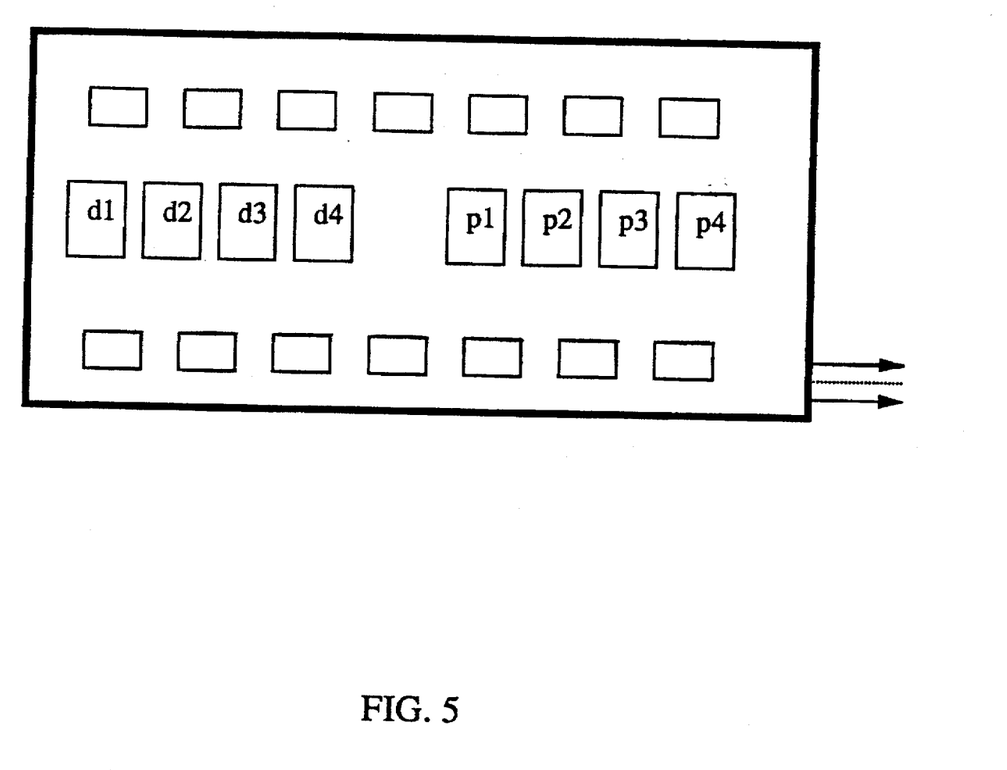
FIG. 5 illustrates an exemplary key pad which includes four keys which can be used selectively for categorizing four direction codes, and four keys which can be selectively used for categorizing four position codes.

FIG. 5 shows four direction code keys d1, d2, d3 and d4 which can be chosen by a user to categorize the direction codes for four types of direction codes. The number four is not unique, and can be chosen as desired. Position code keys p1, p2, p3 and p4 can likewise be chosen to categorize the position codes for four quadrants. Again, the number four is not unique and can be chosen as desired. It is to be appreciated that the direction code keys and the position code keys can be used to create position and direction codes for all the character strokes in lieu of writing a character and letting the system create the direction and position codes.

Comparator for Comparing the String Codes of Characters

In the process of character recognition, an already stored string code for a known character (with N strokes with a predetermined sequence) is compared digit by digit with the string code generated for a handwritten character which is to be identified. As explained herein before, only the significant types of code, i.e., the first and second need be compared. The third code, 'x' for instance which suggests variations which have to be addressed, need not necessarily be compared. If as a result of comparison, a match occurs with a selected stored character which also has N strokes for instance, such a selected character in printed form is displayed on a display area for approval by the user. If the right character appears, then the user can approve it and make it part of the word-processing or the typing which is required. If not, mapping and a search for a match can be continued.

Also described herein before is a system using direction and code keys for codification of character strokes of a language character, using direction and position codes to generate a code string which can be compared with a stored printed character code string to arrive at a match.

It is seen that the foregoing system and method make a provision for recognizing handwriting variations, and variations in an individual's writing from time to time, and even cursive writing which is predictable, so long as the results of the aforesaid variations are all mapped to the right stored Chinese or other language character as the case may be. The inventive system also teaches codification of character strokes by using keys on a key pad without having to write the character.

While the foregoing describes a method and system for a novel manner of codification and character recognition, using preferred examples, it can be readily seen that alternative equivalents for the numbers of sectors for the direction and position coding, and the angles a1, a2, a3 are conceivable. All such variations and alternative equivalents are within the ambit of the present invention which is defined by appended claims.

I claim:

1. A system for encoding and recognizing a language character having N character strokes in a generally accepted predetermined sequence, each of the strokes being directed from a start to an end, and wherein the ends of the character strokes need not coincide with any of the starts among the character strokes, said system comprising:

storage means for storing a plurality of strings of defined code signifying language characters;

a direction code means responsive to formation of the character strokes for providing a direction code signifying direction of the end relative to the start of each of said N character strokes independent of intermediate positions between the start and end of each of said N character strokes;

a position code means responsive to said N character strokes for providing a position code based on direction from the end of all but the last one of said N character strokes to the start of the next one of said N character strokes; and comparison means coupled to the direction and position code means for comparing a newly formed sequence of the direction and position codes to the strings of defined code contained in said storage means.

2. A system as recited in claim 1 wherein said direction and position codes each comprise two digits, each of the digits using one of at least a pair of coding symbols, said strings of defined code employing said pair of coding symbols and in some instances a third coding symbol signifying either one of said pair of coding symbols, wherein either one of the pair of coding symbols in the newly formed sequence of the direction codes will be deemed to match the third coding symbol.

3. A system as recited in claim 2 wherein said third coding symbol in said strings of defined code will be deemed to match either one of the pair of coding symbols in the newly formed sequence of the direction and position codes.

4. A system as recited in claim 1 wherein said direction and position codes each comprise two digits, each of the digits using one of at least a pair of coding symbols, said comparison means being operable to (a) respond to said N character strokes being formed by hand, and (b) display instead of said N character strokes formed by hand, a stored character defined by one of said strings of defined code for use in typing and word processing.

5. A system as recited in claim 1 wherein said direction code signifies a variable one of four contiguous angular sectors, said direction and position codes each comprising a pair of ordered digits, each of the digits using one of at least a pair of coding symbols, one of the ordered digits for each of the direction codes of adjacent ones of said sectors being assigned, with identical ordering, an identical one of the coding symbols.

6. A system as recited in claim 1 wherein said direction code signifies a variable one of four contiguous angular sectors partitioned by predetermined dividing vectors: a first vector pointing right and at an angle a1 clockwise from an abscissa, a second vector pointing down and at an angle a2 counterclockwise from an ordinate, a third vector pointing down and at an angle a3 clockwise from the ordinate, and a fourth vector pointing left with respect to an origin.

7. A system as recited in claim 6 wherein said position code signifies a variable one of four angular sections, indicating a range of directions between successive ones of the N character strokes.

8. A system as recited in claim 6 wherein said direction and position codes each comprise two digits, each of the digits using one of at least a pair of coding symbols comprising '0' and '1', and wherein said four contiguous angular sectors together encompass 360°, a first, second, third and fourth one of the angular sectors extending between: (a) the first and fourth vector, (b) the fourth and third vectors, (c) the third and second vectors, and (d) the second and first vectors, respectively.

9. A system as recited in claim 8 wherein said first, second, third and fourth one of said sectors are identified in said direction code by two digit codes: '00', '10', '11', and '01', respectively.

10. A system as recited in claim 9 wherein said angles a1, a2, a3 are acute angles.

11. A system as recited in claim 10 wherein said angles a1, a2, a3 are each approximately 15°.

12. A system as recited in claim 1 wherein said direction code signifies a variable one of four contiguous angular sectors.

13. A system as recited in claim 12 wherein said position code signifies a discrete one of four angular sections indicating a range of directions between successive ones of the N character strokes.

14. A system as recited in claim 1 wherein said direction and position codes each comprise two digits, each of the digits using one of at least a pair of coding symbols, and wherein the newly formed sequence of the direction and position codes, after all said N character strokes are encoded, comprise a succession of 4N-2 digits of code, said comparison means being operable to store in said storage means the newly formed sequence if absent from said storage means.

15. A system as recited in claim 1 wherein said direction and position codes each comprise two digits, each of the digits using one of at least a pair of coding symbols, said strings of defined code employing said pair of coding symbols and in some instances a third coding symbol signifying either one of said pair of coding symbols, and wherein the newly formed sequence of the direction and position codes, after all said N character strokes are encoded, comprises a succession of 4N-2 digits of code, said comparison means comprising:

the third coding symbol in said strings of defined code will be used to augment potential matches with the newly formed sequence by accepting character strokes with position and direction codes signifying alternate directions for the starts and the ends of character strokes.

16. A method of encoding and recognizing a language character having N character strokes in a generally accepted predetermined sequence, each of the strokes being directed from a start to an end, and wherein the ends of the character strokes need not coincide with any of the starts among the character strokes, said method comprising the steps of:

providing a direction code in response to formation of the character strokes, signifying direction of the end relative to the start of each of said N character strokes independent of intermediate positions between the start and end of each of said N character strokes;

providing a position code in response to said N character strokes, based on direction from the end of all but the last one of said N character strokes to the start of succeeding ones of said N character strokes; and comparing a newly formed sequence of the direction and position codes to a prerecorded plurality of strings of defined code signifying language characters.

17. A method as recited in claim 16 wherein said direction and position codes each comprise two digits, each of the digits using one of at least a pair of coding symbols, said strings of defined code employing said pair of coding symbols and in some instances a third coding symbol signifying either one of said pair of coding symbols, wherein either one of the pair of coding symbols in the newly formed sequence of the direction codes will be deemed to match the third coding symbol.

18. A method as recited in claim 17 wherein said third coding symbol in said strings of defined code will be deemed to match either one of the pair of coding symbols in the newly formed sequence of the direction and position codes.

19. A method as recited in claim 16 wherein said direction code signifies a variable one of four contiguous angular sectors, said direction and position codes each comprising a pair of ordered digits, each of the digits using one of at least a pair of coding symbols, one of the ordered digits for each of the direction codes of adjacent ones of said sectors being assigned, with identical ordering, an identical one of the coding symbols.

20. A method as recited in claim 16, wherein said strings of defined code comprise a series of digits, said direction and position codes each comprising two digits, each of the digits of said strings and said direction and position codes using one of at least a pair of coding symbols.

21. A method as recited in claim 20, wherein at least some of said digits of said strings of defined code employ a third coding symbol signifying either one of said pair of coding symbols, wherein either one of the pair of coding symbols in the newly formed sequence of the direction codes can be deemed to match the third coding symbol, and wherein variations in writing styles of different individuals while writing a given stroke in a given character are accommodated, in that the third coding symbol in said strings of defined code will be used to augment potential matches with the newly formed sequence by accepting character strokes with position and direction codes signifying alternate directions for the starts and the ends of character strokes.

22. A method as recited in claim 16 comprising the steps of:

composing each of said direction and position codes with two digits to produce for each of the newly formed sequences of N character strokes a code 4N-2 digits long, each of the digits using one of at least a pair of coding symbols; and prerecording said plurality of prerecorded plurality of strings of defined code with strings that signify a language character of N character strokes having 4N-2 digits, the step of comparing newly formed sequences being performed by:

comparing 4N-2 digits of said newly formed sequence to 4N-2 digits of strings of defined code signifying language characters.

23. A method as recited in claim 22 wherein at least some of said digits of said strings of defined code employ a third coding symbol signifying either one of said pair of coding symbols, the step of comparing newly formed sequences being performed by:

identifying an effective match to the third coding symbol by either one of the pair of coding symbols among the 4N-2 digits in the newly formed sequence of the direction codes, so that a given character stroke can end in more than one location depending on variations in writing styles of different individuals while writing a given stroke in a given character.

* * * * *